April 12, 1966   C. M. ROSSER   3,245,838
ELECTRO-CHEMICAL GENERATOR
Filed May 11, 1962
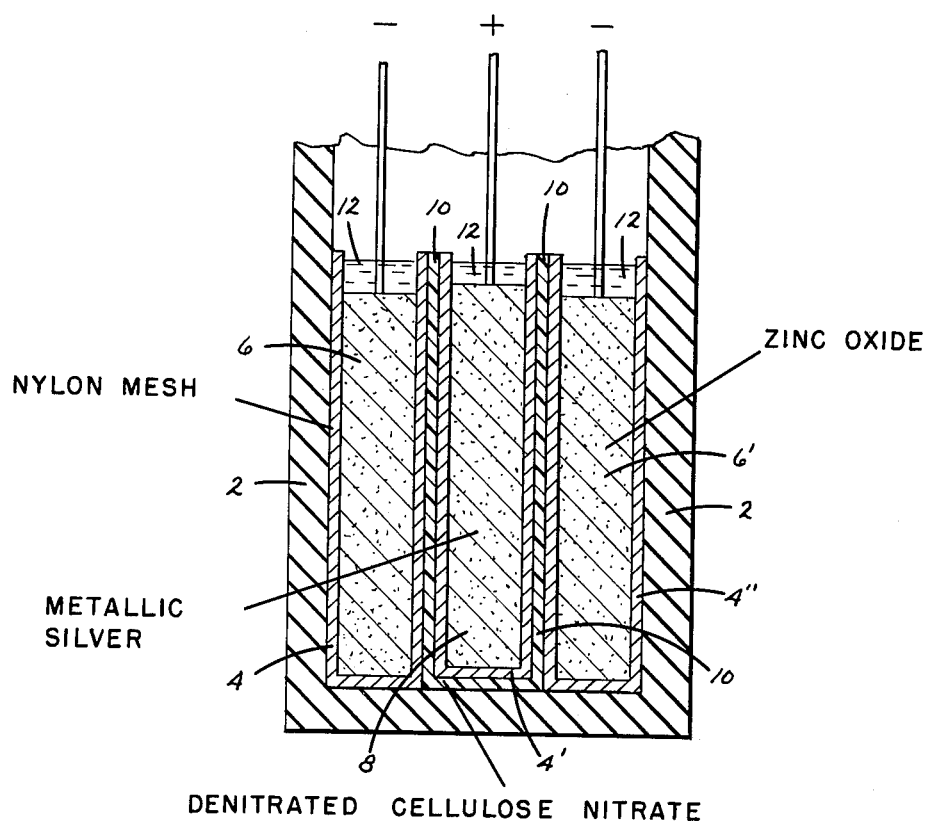

3,245,838
ELECTRO-CHEMICAL GENERATOR
Charles M. Rosser, Wallingford, Pa., assignor, by mesne assignments, to FMC Corporation, San Jose, Calif., a corporation of Delaware
Filed May 11, 1962, Ser. No. 194,100
6 Claims. (Cl. 136—146)

This invention relates to an electro-chemical generator including a semi-permeable separator.

It is conventional in an electric battery to use semi-permeable membranes to separate the electrodes which permit the transfer of electrolyte ions but prevent the migration of larger metallic particles from one electrode to the other. Non-fibrous cellulose sheets which have been prepared by the regeneration of viscose have been employed as semi-permeable separator material in electric batteries. This material, while relatively inexpensive is too readily oxidized in the electrolyte medium and breaks down with a resulting battery failure. Various methods have been employed to counteract the rapid oxidation of cellulose film including increasing the number of layers of the film around the electrode, chemically treating the cellulose film to improve its oxidation resistance, and utilizing other porous materials with the cellulose film to provide extra strength. These methods have the obvious disadvantage of adding additional expense to the use of this type of separator material.

It is an object of this invention to provide an electro-chemical generator having an inexpensive and easily manufactured separator.

It is another object of this invention to provide an electro-chemical generator having a semi-permeable cellulose membrane separator which has improved oxidation resistance.

These and other objects are accomplished in accordance with this invention which comprises an electro-chemical generator having a positive electrode, a negative electrode, electrolyte, and a semi-permeable de-esterified cellulose ester membrane separating said electrodes. The de-esterified cellulose ester membrane is preferably denitrated cellulose nitrate or deacetylated cellulose acetate film.

Cellulose nitrate film is readily denitrated by known methods. For the purpose of this invention the denitrated cellulose nitrate film may be prepared by extruding collodion in the form of a film or tube into an aqueous medium to coagulate the cellulose nitrate. The sheet or tube is then run through a deoxidizing or reducing bath such as an aqueous solution of ammonium hydrosulfide. After sufficient time for complete deesterification the material is washed and dried. De-esterified cellulose ester films such as cellulose acetate may be prepared by forming films or sheets of primary or secondary cellulose acetate solutions, coagulating the films and then saponifying the film or tube by immersing in a dilute sodium hydroxide solution. Upon complete de-esterification the film is washed and dried. Other cellulose esters include, for example, cellulose formate, cellulose propionate, etc.

The de-esterified cellulose ester separator of this invention is most usually employed in a battery containing an alkaline electrolyte medium, preferably a strong aqueous solution of an alkali metal hydroxide. The positive electrode is preferably either a silver or nickel-containing electrode, while the negative electrode is preferably either a cadmium or a zinc-containing electrode.

The drawing is a cross sectional view of a silver/zinc oxide battery having a semi-permeable membrane according to the invention.

A specific embodiment of this invention is seen in the accompanying drawing in which 2 is the battery casing. 4, 4' and 4" are permeable nylon separators. In general, any oxidation-resistant cellulosic or synthetic resin fabric or mesh is useful for the permeable separator. 6 and 6' are negative electrodes of zinc oxide, and 8 is a positive electrode of metallic silver. 10 represents one or more layers of semi-permeable membrane which is non-fibrous denitrated cellulose nitrate film. 12 is the electrolyte solution which in this embodiment is an aqueous solution of 45% potassium hydroxide.

To demonstrate the advantageous oxidation resistance of the de-esterified cellulose ester film of this invention the following example is set forth.

*Example*

Electro-chemical generators were prepared having silver-containing positive electrodes and zinc-containing negative electrodes and a strong aqueous potassium hydroxide electrolyte solution in battery casings. In one of these batteries the electrodes were wrapped with sufficient layers of a silver-treated regenerated viscose film to provide a total separator thickness of about 6 mils. In a similar battery the electrodes were wrapped with sufficient layers of denitrated cellulose nitrate film to provide a separator thickness of about 6 mils. Silver treatment of the regenerated viscose film is known to substantially increase the oxidation resistance of the cellulose separator. The method for silver-treating regenerated viscose is set forth in U.S. Patent No. 3,013,099.

The two batteries were continuously discharged and recharged until internally shorted. It was found that the battery containing the denitrated cellulose nitrate separators provided substantially as good service as the battery containing the silver-treated regenerated viscose separators. Both of the batteries had an effective life of over 6 months while untreated regenerated viscose films under similar conditions provide much shorter battery life.

In addition to the above battery test, films of untreated regenerated viscose and denitrated cellulose nitrate were evaluated by suspending film strips in a flask containing an aqueous solution of 45% potassium hydroxide with a weight of 225 lbs./sq. in. clamped to the film. The film was placed into the bath so that one half of the film remained above the liquid level while the remaining portion including the weight was submerged in the caustic solution at 57° C. The length of time required for the film to break was recorded. In this test the regenerated viscose film strip broke at an average time of 19 hours while the denitrated cellulose nitrate film broke at an average time of 50 hours.

Various changes and modifications may be made in practicing the invention without departing from the spirit and scope thereof and, therefore, the invention is not to be limited except as defined in the appended claims.

I claim:
1. An electro-chemical generator comprising a positive electrode, a negative electrode, electrolyte, and a semi- permeable completely de-esterified cellulose ester membrane separating said electrodes.

2. The electro-chemical generator of claim 1 wherein the semi-permeable membrane is denitrated cellulose nitrate.

3. The electro-chemical generator of claim 1 wherein the electrolyte is alkaline.

4. An electro-chemical generator comprising a silver-containing electrode, a zinc-containing electrode, an alkaline electrolyte solution, a semi-permeable membrane of completely de-esterified cellulose ester separating said electrodes.

5. The electro-chemical generator of claim 4 wherein the semi-permeable membrane is denitrated cellulose nitrate.

6. The electro-chemical generator of claim 4 wherein the alkaline electrolyte is an alkali metal hydroxide.

References Cited by the Examiner

UNITED STATES PATENTS

| | | | |
|---|---|---|---|
| 2,574,533 | 11/1951 | Cornwell et al. | 204—296 |
| 2,696,515 | 12/1954 | Koren et al. | 136—146 |
| 2,724,011 | 11/1955 | Strauss | 136—146 |
| 2,915,579 | 12/1959 | Mendelsohn | 136—146 |
| 3,022,367 | 2/1962 | Horowitz et al. | 136—146 |

WINSTON A. DOUGLAS, *Primary Examiner.*

JOHN R. SPECK, JOHN MACK, *Examiners.*